US010934921B2

(12) United States Patent
Culbertson et al.

(10) Patent No.: US 10,934,921 B2
(45) Date of Patent: Mar. 2, 2021

(54) HEATER ELEMENT AS SENSOR FOR TEMPERATURE CONTROL IN TRANSIENT SYSTEMS (71) Applicant: WATLOW ELECTRIC MANUFACTURING COMPANY, St. Louis, MO (US)

(72) Inventors: David P. Culbertson, Bristol, WI (US); Jeremy Ohse, St. Louis, MO (US); Mark D. Everly, St. Charles, MO (US); Jeremy J. Quandt, Winona, MN (US); James Pradun, Lake Geneva, WI (US); John Rohde, Winona, MN (US); Mark L. G. Hoven, Winona, MN (US); Bret Wadewitz, Winona, MN (US); Sanhong Zhang, Ballwin, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 878 days.

(21) Appl. No.: 15/447,964

(22) Filed: Mar. 2, 2017

(65) Prior Publication Data
US 2017/0359857 A1 Dec. 14, 2017

Related U.S. Application Data (60) Provisional application No. 62/302,482, filed on Mar. 2, 2016.

(51) Int. Cl.
*F01N 9/00* (2006.01)
*F01N 11/00* (2006.01)
(Continued)

(52) U.S. Cl.
CPC ............ *F01N 9/005* (2013.01); *F01N 3/023* (2013.01); *F01N 3/027* (2013.01); *F01N 3/2006* (2013.01);
(Continued)

(58) Field of Classification Search
None
See application file for complete search history.

(56) References Cited

U.S. PATENT DOCUMENTS 1,467,810 A 9/1923 Pilling et al.
1,791,561 A 2/1931 Heyn et al.
(Continued)

FOREIGN PATENT DOCUMENTS

CN 201555357 8/2010
DE 102006032698 A1 * 1/2008 ......... A47L 15/4287
(Continued)

OTHER PUBLICATIONS

Dean Starr, Ph.D., and T. P. Wang, Ph.D., The Electrical Characteristics of a Nickel-Chromium-Aluminium-Copper Resistance Wire,Paper No. 2398 M, Sep. 1957 (Year: 1957).*
(Continued)

*Primary Examiner* — Matthew G Marini
(74) *Attorney, Agent, or Firm* — Burris Law, PLLC (57) ABSTRACT A method of predicting the temperature of a resistive heating element in a heating system is provided. The method includes obtaining resistance characteristics of resistive heating elements and compensating for variations in the resistance characteristics over a temperature regime. The resistance characteristics of the resistive heating element include, but are not limited to, inaccuracies in resistance measurements due to strain-induced resistance variations, variations in resistance due to the rate of cooling, shifts in power output due to exposure to temperature, resistance to temperature relationships, non-monotonic resistance to temperature relationships, system measurement errors, and combinations of resistance characteristics. The method
(Continued)

includes interpreting and calibrating resistance characteristics based on a priori measurements and in situ measurements.

21 Claims, 5 Drawing Sheets (51) Int. Cl.
| | |
|---|---|
| F01N 3/027 | (2006.01) |
| G01K 7/16 | (2006.01) |
| G01F 1/68 | (2006.01) |
| H05B 1/02 | (2006.01) |
| F01N 13/00 | (2010.01) |
| F02D 41/02 | (2006.01) |
| F02D 41/14 | (2006.01) |
| G05D 23/185 | (2006.01) |
| F01N 3/20 | (2006.01) |
| F02D 41/22 | (2006.01) |
| G01M 15/05 | (2006.01) |
| G07C 5/08 | (2006.01) |
| H05B 3/20 | (2006.01) |
| H05B 3/40 | (2006.01) |
| G05D 23/24 | (2006.01) |
| G05D 23/30 | (2006.01) |
| H05B 3/14 | (2006.01) |
| G01F 1/86 | (2006.01) |
| H05B 3/18 | (2006.01) |
| H05B 3/00 | (2006.01) |
| F01N 3/023 | (2006.01) |
| F01N 3/10 | (2006.01) |
| F01N 3/021 | (2006.01) |
| F01N 3/08 | (2006.01) |
| H01C 7/02 | (2006.01) |
| H01C 7/04 | (2006.01) |

(52) U.S. Cl.
CPC .......... *F01N 3/2013* (2013.01); *F01N 9/00* (2013.01); *F01N 9/002* (2013.01); *F01N 11/002* (2013.01); *F01N 11/005* (2013.01); *F01N 13/0097* (2014.06); *F02D 41/024* (2013.01); *F02D 41/1446* (2013.01); *F02D 41/1447* (2013.01); *F02D 41/22* (2013.01); *F02D 41/222* (2013.01); *G01F 1/68* (2013.01); *G01F 1/86* (2013.01); *G01K 7/16* (2013.01); *G01M 15/05* (2013.01); *G05D 23/185* (2013.01); *G05D 23/2401* (2013.01); *G05D 23/30* (2013.01); *G07C 5/0808* (2013.01); *H05B 1/0227* (2013.01); *H05B 1/0244* (2013.01); *H05B 3/0042* (2013.01); *H05B 3/141* (2013.01); *H05B 3/18* (2013.01); *H05B 3/20* (2013.01); *H05B 3/40* (2013.01); *F01N 3/021* (2013.01); *F01N 3/0814* (2013.01); *F01N 3/103* (2013.01); *F01N 3/106* (2013.01); *F01N 3/2066* (2013.01); *F01N 2240/10* (2013.01); *F01N 2240/16* (2013.01); *F01N 2240/36* (2013.01); *F01N 2410/00* (2013.01); *F01N 2410/04* (2013.01); *F01N 2550/22* (2013.01); *F01N 2560/06* (2013.01); *F01N 2560/07* (2013.01); *F01N 2560/12* (2013.01); *F01N 2560/20* (2013.01); *F01N 2610/102* (2013.01); *F01N 2900/0416* (2013.01); *F01N 2900/1404* (2013.01); *F01N 2900/1406* (2013.01); *F01N 2900/1411* (2013.01); *F01N 2900/1602* (2013.01); *F02D 2041/1433* (2013.01); *F02D 2041/228* (2013.01); *F28F 2200/00* (2013.01); *G01K 2205/04* (2013.01); *H01C 7/02* (2013.01); *H01C 7/04* (2013.01); *H05B 2203/019* (2013.01); *H05B 2203/021* (2013.01); *H05B 2203/022* (2013.01); *Y02T 10/12* (2013.01); *Y02T 10/40* (2013.01)

(56) References Cited

U.S. PATENT DOCUMENTS

| | | |
|---|---|---|
| 3,037,942 A | 6/1962 | Ingold et al. |
| 3,231,522 A | 1/1966 | Blodgett et al. |
| 4,465,127 A | 8/1984 | Andro et al. |
| 4,960,551 A | 10/1990 | Eonomoto et al. |
| 5,746,053 A | 5/1998 | Hibino |
| 6,090,172 A | 7/2000 | Dementhon et al. |
| 6,134,960 A | 10/2000 | Yamakawa et al. |
| 6,396,028 B1 | 5/2002 | Radmacher |
| 6,474,155 B1 | 11/2002 | Berkcan et al. |
| 6,483,990 B1 | 11/2002 | Bikhovsky |
| 6,704,497 B2 | 3/2004 | Bikhovsky |
| 7,196,295 B2 | 3/2007 | Fennewald |
| 7,258,015 B1 | 8/2007 | Shaw et al. |
| 7,495,467 B2 | 2/2009 | Lin et al. |
| 7,829,048 B1 | 11/2010 | Gonze et al. |
| 8,037,673 B2 | 10/2011 | Gonze et al. |
| 8,057,581 B2 | 11/2011 | Gonze et al. |
| 8,112,990 B2 | 2/2012 | Gonze et al. |
| 8,146,350 B2 | 4/2012 | Bhatia et al. |
| 8,302,384 B2 | 11/2012 | Konieczny et al. |
| 8,355,623 B2 | 1/2013 | Vinegar et al. |
| 8,622,133 B2 | 1/2014 | Kaminsky |
| 8,979,450 B2 | 3/2015 | Huber et al. |
| 9,130,004 B2 | 9/2015 | Obu et al. |
| 2004/0056321 A1 | 3/2004 | Parsons |
| 2005/0028587 A1 | 2/2005 | Baer et al. |
| 2008/0134669 A1 | 6/2008 | Lange |
| 2009/0074630 A1 | 3/2009 | Gonze et al. |
| 2010/0102052 A1 | 4/2010 | Boardman |
| 2010/0287912 A1 | 11/2010 | Gonze et al. |
| 2013/0213010 A1 | 8/2013 | Zhang et al. |
| 2014/0190151 A1 | 7/2014 | Culbertson et al. |
| 2014/0217087 A1* | 8/2014 | Biller ............... H05B 1/0227 219/494 |
| 2014/0343747 A1 | 11/2014 | Culbertson et al. |
| 2015/0185061 A1 | 7/2015 | Otsuka et al. |

FOREIGN PATENT DOCUMENTS

| | | |
|---|---|---|
| EP | 0384640 | 8/1990 |
| FR | 2963097 | 1/2012 |
| GB | 2374783 | 10/2002 |
| JP | H06336915 | 12/1994 |
| JP | 2008019780 | 1/2008 |
| WO | 2003/036041 | 5/2003 |

OTHER PUBLICATIONS

Translation of DE2006032698A1 (Year: 2008).*
ISRWO of PCT/US2017/020506 dated May 24, 2017.

* cited by examiner

HEATER ELEMENT AS SENSOR FOR TEMPERATURE CONTROL IN TRANSIENT SYSTEMS

CROSS-REFERENCE TO RELATED APPLICATIONS

This application claims priority to and the benefit of U.S. provisional application Ser. No. 62/302,482, filed on Mar. 2, 2016, the contents of which are incorporated herein by reference in their entirety. This application is also related to co-pending applications titled "Virtual Sensing System," "System and Method for Axial Zoning of Heating Power," "Heater Element Having Targeted Decreasing Temperature Resistance Characteristics," "Dual-Purpose Heater and Fluid Flow Measurement System," "Heater-Actuated Flow Bypass," "Susceptor for Use in a Fluid Flow System," "Thermal Storage Device for Use in a Fluid Flow System," and "Bare Heating Elements for Heating Fluid Flows" concurrently filed herewith, the contents of which are incorporated herein by reference in their entirety.

FIELD

The present disclosure relates to heating and sensing systems for fluid flow applications, for example vehicle exhaust systems, such as diesel exhaust and aftertreatment systems.

BACKGROUND

The statements in this section merely provide background information related to the present disclosure and may not constitute prior art.

The use of physical sensors in transient fluid flow applications such as the exhaust system of an engine is challenging due to harsh environmental conditions such as vibration and thermal cycling. One known temperature sensor includes a mineral insulated sensor inside a thermowell that is then welded to a support bracket, which retains a tubular element. This design, unfortunately, takes a long amount of time to reach stability, and high vibration environments can result in damage to physical sensors.

Physical sensors also present some uncertainty of the actual resistive element temperature in many applications, and as a result, large safety margins are often applied in the design of heater power. Accordingly, heaters that are used with physical sensors generally provide lower watt density, which allows a lower risk of damaging the heater at the expense of greater heater size and cost (same heater power spread over more resistive element surface area).

Moreover, known technology uses an on/off control or PID control from an external sensor in a thermal control loop. External sensors have inherent delays from thermal resistances between their wires and sensor outputs. Any external sensor increases the potential for component failure modes and sets limitations of any mechanical mount to the overall system.

One application for heaters in fluid flow systems is vehicle exhausts, which are coupled to an internal combustion engine to assist in the reduction of an undesirable release of various gases and other pollutant emissions into the atmosphere. These exhaust systems typically include various after-treatment devices, such as diesel particulate filters (DPF), a catalytic converter, selective catalytic reduction (SCR), a diesel oxidation catalyst (DOC), a lean $NO_x$ trap (LNT), an ammonia slip catalyst, or reformers, among others. The DPF, the catalytic converter, and the SCR capture carbon monoxide (CO), nitrogen oxides ($NO_x$), particulate matters (PMs), and unburned hydrocarbons (HCs) contained in the exhaust gas. The heaters may be activated periodically or at a predetermined time to increase the exhaust temperature and activate the catalysts and/or to burn the particulate matters or unburned hydrocarbons that have been captured in the exhaust system.

The heaters are generally installed in exhaust pipes or components such as containers of the exhaust system. The heaters may include a plurality of heating elements within the exhaust pipe and are typically controlled to the same target temperature to provide the same heat output. However, a temperature gradient typically occurs because of different operating conditions, such as different heat radiation from adjacent heating elements, and exhaust gas of different temperature that flows past the heating elements. For example, the downstream heating elements generally have a higher temperature than the upstream elements because the downstream heating elements are exposed to fluid having a higher temperature that has been heated by the upstream heating elements. Moreover, the middle heating elements receive more heat radiation from adjacent upstream and downstream heating elements.

The life of the heater depends on the life of the heating element that is under the harshest heating conditions and that would fail first. It is difficult to predict the life of the heater without knowing which heating element would fail first. To improve reliability of all the heating elements, the heater is typically designed to be operated with a safety factor to avoid failure of any of the heating elements. Therefore, the heating elements that are under the less harsh heating conditions are typically operated to generate a heat output that is much below their maximum available heat output.

SUMMARY

In one form, the present disclosure provides a method of predicting temperature of a resistive heating element. The method includes obtaining resistance characteristics of the resistive heating element and further compensating for variations in resistance characteristics over a variety temperature regimes. The resistance characteristics of the resistive heating element can include at least one of inaccuracies in resistance measurements due to strain-induced resistance variations, variations in resistance due to the rate of cooling, shifts in power output due to exposure to temperature, resistance to temperature relationships, non-monotonic resistance to temperature relationships, system measurement errors, and combinations thereof. The method can further include the steps of interpreting and calibrating resistance characteristics based on at least one of priori measurements and in situ measurements. In one form, the a priori measurements include at least one of shift in resistance due to time, shift in resistance due to temperature exposure, resistive heating element temperature, hysteresis in resistance, emissivity, transient rate of heating to applied power, resistance to temperature relationship, local dR/dT maximums, local dR/dT minimums, specific transient rate of heating to applied power, specific emissivity, and combinations thereof. In another form, the in situ measurements include at least one of fluid mass flow, heater inlet temperature, heater outlet temperature, ambient temperature, resistive heating element temperature, temperature of various masses in the proximity of the heater, resistance at local dR/dT maximums, resistance at local dR/dT minimums, room temperature resistance, resistance at service temperatures, leakage current, power applied to the heater, and combinations thereof.

The present disclosure further provides for a control system for determining and maintaining the temperature of a resistive heating element of a heating system for heating fluid flow. The system includes at least one two-wire resistive heating element and a controller operatively connected to the two-wire resistive heating element. The controller obtains measurements from the two-wire resistive heating element and is operable for adjusting power to the resistive heating element when comparing system data provided with the resistive heating element measurements.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

DETAILED DESCRIPTION

The following description is merely exemplary in nature and is in no way intended to limit the present disclosure, its application, or uses. It should also be understood that steps within a method may be executed in different order without altering the principles of the present disclosure.

In the present disclosure, "a priori" (prior known) and "in situ" (in use) information is used to calibrate the resistive elements of a heater such that the resistive elements can be used as temperature sensors as well as heating elements. In one form, the system combines two-wire control with model-based control to improve heater life and reduce resistive element thermal variations.

Two-wire heaters generally employ a material for the resistive heating element with sufficient TCR (temperature coefficient of resistance) characteristics such that the resistive heating element can function as both a heater and a temperature sensor. Examples of such two-wire heaters are disclosed in U.S. Pat. Nos. 5,280,422, 5,521,850, and 7,196,295, which are commonly assigned with the present application and the contents of which are incorporated herein by reference in their entirety. Appropriate two-wire heater materials may include noble metals, metal alloys of platinum, copper, nickel, chromium, nickel-iron alloys, copper, platinum, nickel, nickel-chromium alloys, nickel-silicone, semiconductor materials such as silicon, germanium, gallium-arsenide, and derivatives thereof. These materials are merely exemplary and should not be construed as limiting the scope of the present disclosure.

Resistance characteristics of a given resistive heating element have inaccuracies due to strain-induced resistance variations, variations in resistance due to the rate of cooling, shifts in output from exposure to temperature, non-monotonic resistance to temperature relationships, system measurement errors, and among others.

Figure 1:
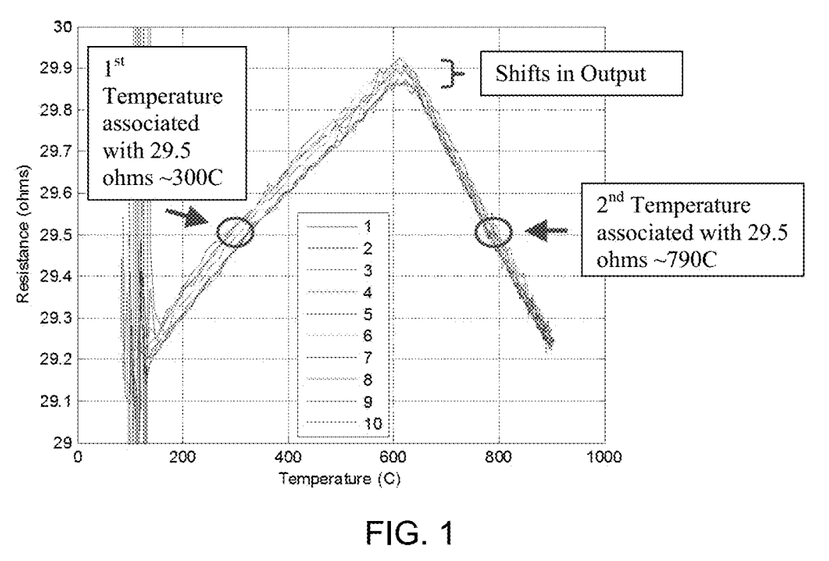
FIG. 1 is a graph illustrating variations in resistance-temperature (R-T) characteristics over a temperature range according to experimental data derived within the development the present disclosure.
Figure 2:
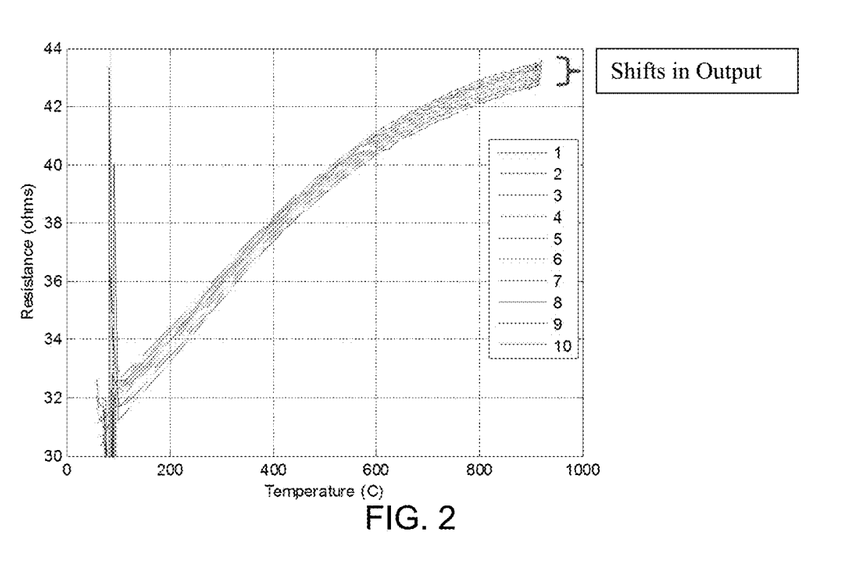
FIG. 2 is a graph illustrating shifts in output of different resistive heating elements and their R-T characteristics according to experimental data derived within the development the present disclosure.
Figure 3:
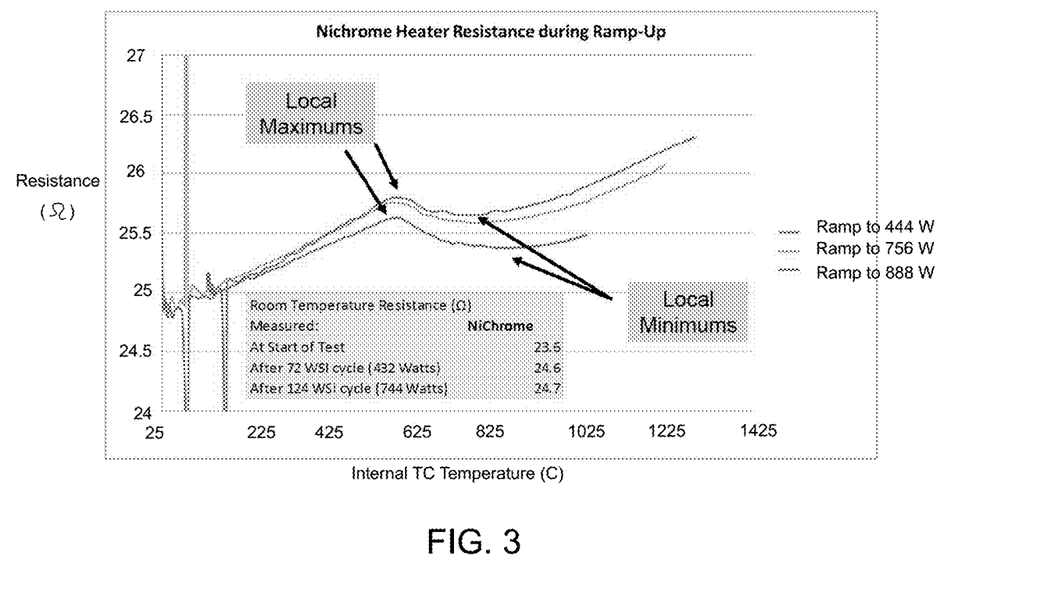
FIG. 3 is a graph of local dR/dT maximums and dR/dT minimums and R-T characteristics according to experimental data derived within the development the present disclosure.

Referring to FIGS. 1-3, these inaccuracies/variations are illustrated, wherein the resistance to temperature (R-T) relationship is shown for multiple uses of a particular material (each of FIGS. 1-3 corresponds to a different material). Referring to FIG. 1, a material was used having a non-monotonic relationship in which a particular resistance value corresponds to more than one temperature. For instance, 29.5 ohms corresponds to both 300° C. and 790° C. temperatures. FIG. 2 shows a resistance to temperature relationship that has shifted from one use to another. FIG. 3 shows non-monotonic behavior in which the same resistance is achieved at three different temperatures and also shows a resistance to temperature relationship that has shifted after use at high temperatures. Since the benefit of using resistance to measure temperature is to accurately know the heater temperature without the use of a separate temperature sensor, the illustrative effects shown in FIGS. 1-3 cause a two-wire control system to have significant limitations for many systems/applications.

In one form, the present disclosure provides for a system that interprets and calibrates the relationship of resistance to temperature based on a priori and in situ information. Table 1 below provides examples of various types of a priori and in situ information that may be employed.

TABLE 1

| A priori | | In situ | |
| --- | --- | --- | --- |
| General Characteristic | Unique Characteristic | System Characteristic | Product Characteristic |
| Typical drift/shift in resistance due to time & temperature exposure | Initial resistance-temperature characteristic | Fluid mass flow | Resistance at local maximum |
| Typical hysteresis in resistance-temperature characteristic | Initial local maximum characteristic | Heater inlet temperature | Resistance at local minimum |
| Typical emissivity characteristics | Initial local minimum characteristic | Heater outlet temperature | Room temperature resistance |

TABLE 1-continued

| A priori | | In situ | |
|---|---|---|---|
| General Characteristic | Unique Characteristic | System Characteristic | Product Characteristic |
| Typical transient rate of heating to applied power characteristic | Initial dynamic power to heater temperature characteristics | Ambient Temperature | Resistance at other temperatures |
| | Heater lot drift/shift characteristic | Temperature of various masses in the proximity of the heater | Leakage current |
| | Specific transient rate of heating to applied power characteristic Specific emissivity characteristic | | Power applied to heater |

For example, in the a priori category, general characteristics are behaviors that are exhibited by heating systems while unique characteristics apply to individual components or groups of components. For the in situ category, system characteristics apply to information that is available outside of the heating system and product characteristics apply to information directly related to the heating system.

Figure 4:
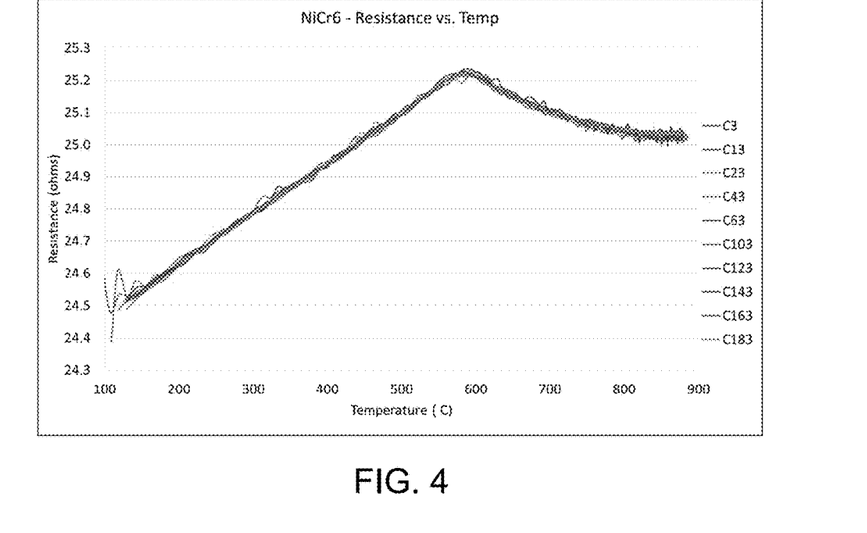
FIG. 4 is another graph illustrating local dR/dT maximums and R-T characteristics according to experimental data derived within the development the present disclosure.

Referring again to FIG. 3, the temperatures at the local maximums have been shown in testing to be stable during rapid heating events. FIG. 4 shows experimental results of over 180 cycles to a temperature of about 900° C. (Temperature was measured by an internal thermocouple in a cartridge type heater in this experiment). Additional testing has shown that after a short burn-in, with rapid heating, the local maximum typically remains within a range of 15° C. even when exposed to higher temperatures that may damage the heater. FIG. 3 illustrates one example of this behavior, although the resistance value goes up after exposure to high temperatures, the temperature at the local maximum does not vary significantly. Although the local minimum appears to vary more than the local maximum, the apparent change may be due to the overall change in slope of the curve. The portion of the curve surrounding the local minimum may also be of use to improve resistance to temperature (R-T) interpretation and calibration.

Figure 5:
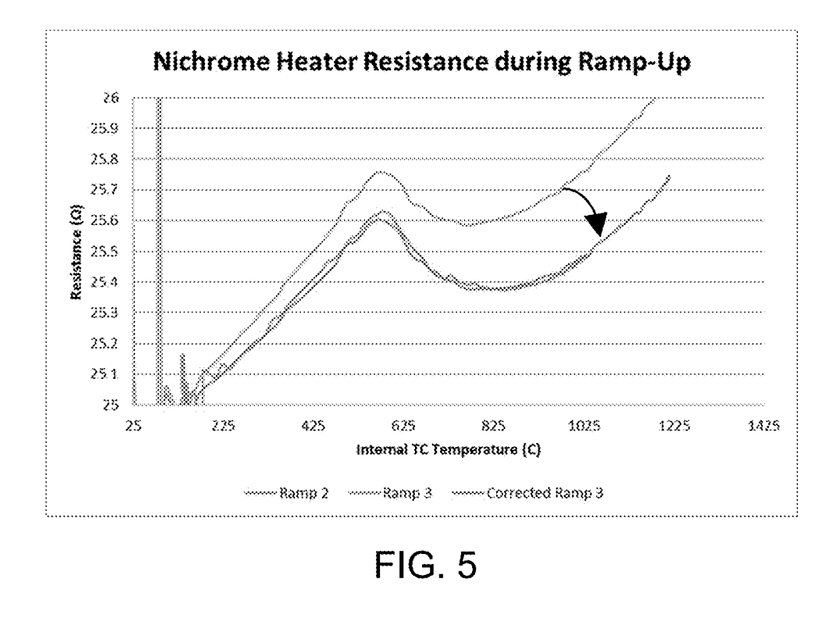
FIG. 5 is yet another graph illustrating local dR/dT maximums and local dR/dT minimums and R-T characteristics according to experimental data derived within the development the present disclosure.

FIG. 3 shows three (3) resistance vs temperature curves for an 80 Nickel, 20 Chromium resistive heating element within a cartridge heater. Due to exposure to high temperatures as high as 1200° C. and higher, the resistance curve has shifted. The table on the chart also shows that room temperature resistance has shifted from an initial value prior to exposure to temperature. If more accurate resistance measurements are possible, then a combination of the shift at the local maximum and the shift at another temperature could be used as a two point in situ calibration. FIG. 5 shows an example of how the shifted curve can be corrected by using resistance values at 200° C. and the local maximum. A 2-point calibration depends on the ability to know a second temperature for the second point of correction. This may require an additional sensor, or may be made at room temperature. This room temperature point may be taken from a prior cooling or shut-down of the system. In diesel systems, heater inlet temperature is often available and may be used for the correction.

Figure 6:
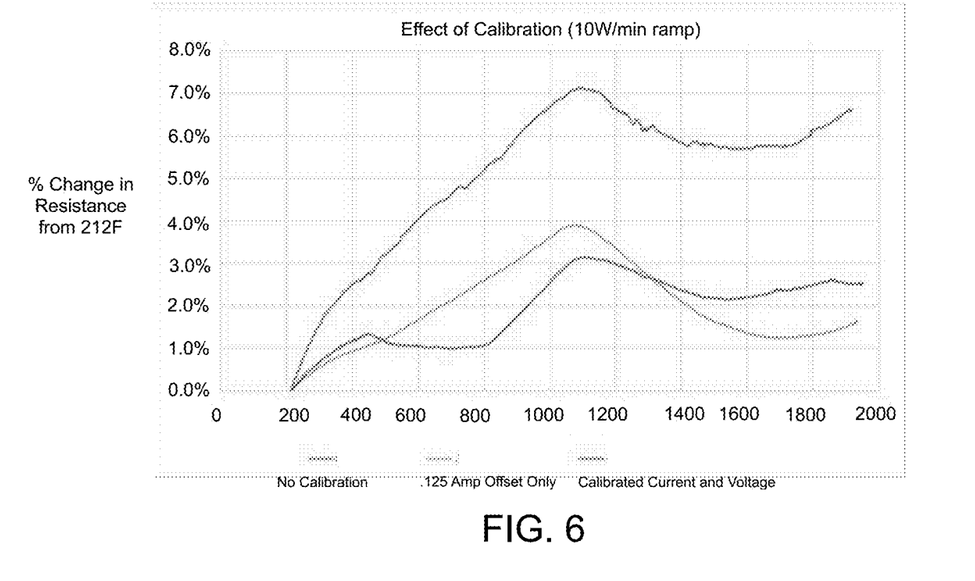
FIG. 6 is a graph illustrating the effect of calibration on the R-T characteristics of a heater according to the present disclosure.

Therefore, a variety of approaches can be used to interpret and calibrate the R-T characteristic, including but not limited to:

1. The local maximum could be used as a single point in situ calibration to adjust the R-T characteristic based on the R value at that point;
2. The local maximum plus additional R-T point(s) could be used as a multi-point in situ calibration. Additional points could be R-T at room temperature or R at any other known temperature(s). FIG. 5 shows an example using data from FIG. 3. The resistance values at 200° C. and the local maximum were used to change the gain of the R-T characteristic and resulted in an effective calibration;
3. By identifying the local maximum or minimum while the resistive heating element is heating or cooling, it enables a heating system to know which portion of the non-monotonic R-T characteristic applies at a particular time (in other words, if an R value corresponds to multiple temperatures, it can be used to determine which one applies);
4. The local maximum or minimum could be used as an input for steady state or transient modeling of the heating system. For a model that is estimating the temperature of the heater, the ability to know the R value and/or the temperature that is indicated by the local maximum or minimum would calibrate the model;
5. The local maximum or minimum could be combined with thermal modeling to achieve a multi-point in situ calibration. For instance, based on a priori (either general or unique) transient rate of heating characteristics, along with in situ mass flow and temperature information, a second R-T point could be inferred based on the model and a time period. When combined with local maximum or minimum R-T information, this would provide a multi-point calibration;
6. The model based approach, using system in situ information such as mass flow, heater inlet and/or temperature(s) and power applied to the heater could be used to calibrate the R-T characteristic without local maximum or minimum information. In addition, ambient temperature information and/or temperature information of regions surrounding the heating system could be used to improve the calibration;
7. Another in-situ measurement that could be used for improved calibration includes measuring the slope of the resistance to temperature relationship when exposed to a known power input. Information about the mass flow rate and inlet temperature could improve this measurement;
8. Since the resistance of the heater conductor does not change significantly with temperatures that are near the local maximum or minimum, virtual sensing and model-based determination of resistive heating element temperature could be used in combination with physical resistance measurements to provide better control near the local maximum and minimum;
9. Any drifts/shifts in output that are able to be characterized based on general or material lot characteristics can be used to improve measurement by updating the R-T calibration;
10. When combined with resistance heating element or heater sheath thermal models (as described above), methods could be employed to identify changes in the R-T curve over time, providing information for the characteristic to be updated to compensate for shifts and enable improved temperature control;
11. Identification of the slope and corresponding temperature of the resistive heating element could enable different control schemes. For example, on-off control may be employed in the positive slope portion of FIG. 1 and control by power for the negative slope portion; and
12. Due to the challenges of making precise amperage measurements in some AC powered systems, the measurement accuracy may not support a two point in situ correction. FIG. 6 shows three R-T curves for the same heater. Some shifting may have occurred, but the primary differences between the curves is due to calibration corrections within the measuring limits of the current transducer. This shows that without precise measurement, a second point of information may not be usable. Even in this case, the local maximum can be identified and used for at least a single point correction. On the other hand, if sufficient resistance measurement accuracy is available, there is an advantage in using two (2) (or more) in situ calibration points. When making a resistance measurement, both the cold portions of a circuit and the heated portions will contribute to the total resistance. The cold portions may include lower resistance heater pins, portions of the power wiring and portions of the measuring circuit. Over time, resistances in these cold portions of the circuit may shift (for instance, a connection point could begin to oxidize and cause an increase in the resistance circuit. Since these errors would be the same for 2 or more measurements at different resistive heating element temperatures, the shift in the cold portions of the circuit could be negated.

13. The use of alternative means to determine the resistive heating element temperature (such as virtual sensing and model-based methods as set forth above) can be used to compare to a resistance-based temperature measurement and provide both diagnostic capability and improve the accuracy of the resistance-based measurement;

14. The resistive heating element temperature measurement will allow the use of different heater control schemes. Based on resistive heating element reliability curves and data, the control can switch between increasing heater life operation and increasing heater performance;

15. Directly controlling the resistive heating element temperature:
   a. The use of the actual resistive heating element average temperature measurement can reduce measurement response delays from thermal junction impedances between the resistive heating element and the measuring sensor. This will allow for the faster control response of a thermal control loop;
   b. The actual resistive heating element temperature measurement can be used to enable the resistive heating element to maintain a constant temperature with a reduced amount of temperature deviations, which will promote longer heater life;
   c. The resistive heating element temperature measurement will allow heater temperatures to be controlled to a higher level, regardless of the control scheme, so as to allow for a faster thermal response. Because the resistive heating element temperature is known, the design margins added to compensate for manufacturing and material variabilities can be reduced, allowing the resistive heating element to be operated at higher temperatures. Higher operating temperatures will result in faster thermal response;
   d. The resistive heating element temperature measurement can be used to reduce mechanical failures of externally mounted sensors in high vibration applications;

Accordingly, by calculating the temperature of the resistive heating element and accounting for the R-T characteristics as set forth above, safety margins can be reduced, the heater can operate at higher temperatures, and faster response times for the heater such that heat may be transferred more rapidly to a target, such as by way of example, the exhaust gas so that a catalyst can rise to its target temperature faster.

In one form of the present disclosure, control algorithms are employed that use differential equations for change in temperature over time (dT/dt). The control system is operable to measure voltage and current and then calculate real time power and resistance for each element above. In one form, a J1939 communications bus is used to provide exhaust mass flow from an engine controller and heater inlet temperature ($T_{in}$) from a sensor to a power switch, for example, a DC power switch.

In one form, a convective heat transfer coefficient ($h_c$) can be calculated based on heater geometry, mass flow ($\dot{m}$), and $T_{in}$, as shown below for one example heater geometry and at least the following or similar equations:

$$T_{sheath} = \frac{wsm}{h_c} + T_{out} \qquad (\text{eqn. 1})$$

$$\overline{h_c} = \frac{\overline{Nu_D} \cdot k}{D} \qquad (\text{eqn. 2})$$

$$\overline{Nu_D} = C_2 \cdot C \cdot Re_D^m \cdot Pr^{0.36} \cdot \left(\frac{Pr}{Pr_s}\right)^{\frac{1}{4}} \qquad (\text{eqn. 3})$$

$$Re_D = \frac{\rho \cdot V_{max} D}{\mu} \qquad (\text{eqn. 4})$$

$$V_{max} = \frac{S_T}{S_T - D} V_{in} \qquad (\text{eqn. 5})$$

$$V_{in} = \frac{\dot{m}}{\rho \cdot A_c} \qquad (\text{eqn. 6})$$

$$\dot{m}_{exh} = \dot{m}_{inlet} + \dot{m}_{fuel} \qquad (\text{eqn. 7})$$

where:
Ac=Heater cross-sectional area;
C=A first constant based on Reynolds number (Re) and Table 2 shown below;
$C_2$=Offset based on number of heater elements, when evaluating element 1, see Table 2 below, use $N_L$=1; when evaluating 6 elements, $N_L$ starts at 0.7 and increases to 0.92 as each element is analyzed;
D=Heater element diameter;
$h_c$=Convective heat transfer coefficient;
$\overline{h_c}$=Absolute convective heat transfer coefficient (Kelvin);
k=Thermal conductivity of air;
m=A second constant based on Reynolds number (Re) and Table 2 shown below;
$\dot{m}$=Mass flow;
$\dot{m}_{exh}$=Mass flow rate of the exhaust;
$\dot{m}_{in}$=Mass flow rate of the inlet;
$\dot{m}_{fuel}$=Mass flow rate of the fuel;
$N_L$=Number of elements;
$\overline{Nu_D}$=Nusselt number;
Pr=Prandtl number of air taken at gas temperature;
$Pr_s$=Prandtl number of air taken at sheath temperature;
ρ=Density;
$Re_D$=Reynolds number for a given diameter and velocity;
$S_T$=Transverse distance between elements;
$T_{out}$=Heater outlet temperature;
$T_{sheath}$=Sheath temperature;
μ=Viscosity of air;
$V_{in}$=Velocity of the fluid flow at the inlet;
$V_{max}$=Velocity of the fluid flow at maximum; and
wsm=Watts per square meter.

TABLE 2

| | Re$_{D, max}$ | C ("C$_1$") | m |
|---|---|---|---|
| | 10-100 | 0.80 | 0.40 |
| | 100-1000 | (Single cylinder approx.) | (Single cylinder approx.) |
| | 1000-200k | 0.27 | 0.63 |
| Single Cylinder | 40-4000 | 0.683 | 0.466 |

| | | | | | | |
|---|---|---|---|---|---|---|
| N$_L$ | 1 | 2 | 3 | 4 | 5 | 6 |
| C$_2$ | 0.70 | 0.80 | 0.86 | 0.89 | 0.90 | 0.92 |

Figure 7:
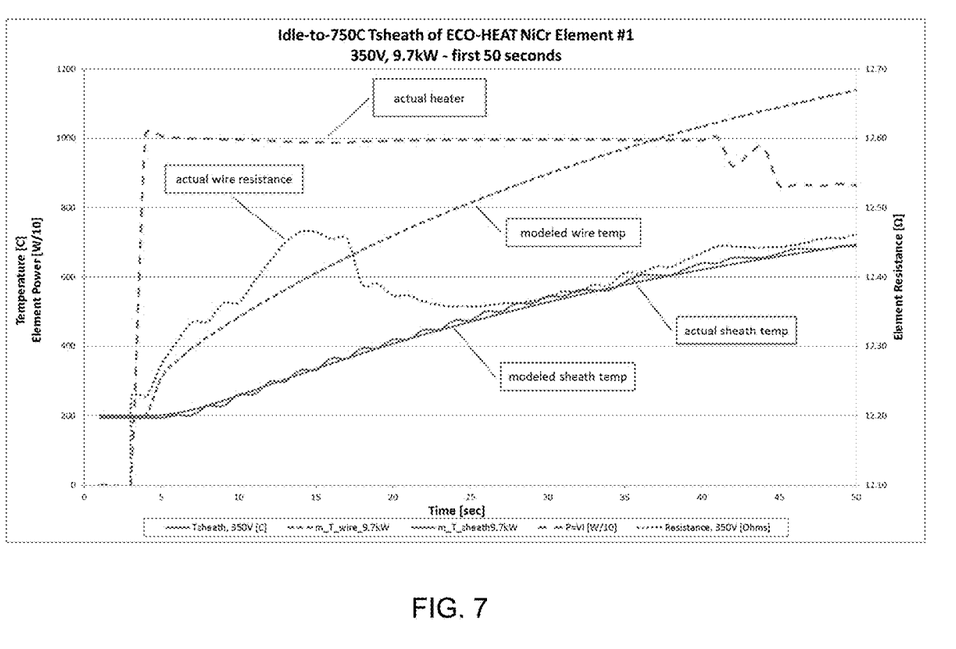
FIG. 7 is a graph illustrating a comparison between an actual measured sheath temperature and a modeled sheath temperature according to the teachings of the present disclosure.

In another form, the thermal conductivity (k), or the thermal diffusivity ($\alpha$), of an insulator (example material may include MgO) is calibrated to a two-wire resistance measurement. As shown in FIG. 7, using these exemplary equations and inputs of mass flow, heater geometry, and inlet temperature (T$_{in}$), the modeled sheath temperature corresponded well with the actual sheath temperature. Using such equations and approaches, a system can be controlled to a virtual temperature without the use of an actual temperature sensor. It should be understood that a variety of heater types and geometries can be modeled, along with using equations that compensate for effects such as radiation, among a variety of system fluctuations, while remaining within the scope of the present disclosure.

In summary, the disclosed virtual sensing according to the teachings of the present disclosure reduces the number of physical sensors based on a model-based interpretation and processing of system parameters. In some cases, a physical sensor may still be used in the thermal system, however, the total number that may be desired is reduced by using virtual sensing. Also, the virtual sensing improves the responsiveness of feedback signals or parameters used for control. More specifically, a model of the system is used to predict the system response based on available signals. Further, the accuracy of a temperature is improved in applications where the physical temperature is difficult to obtain.

Figure 8:
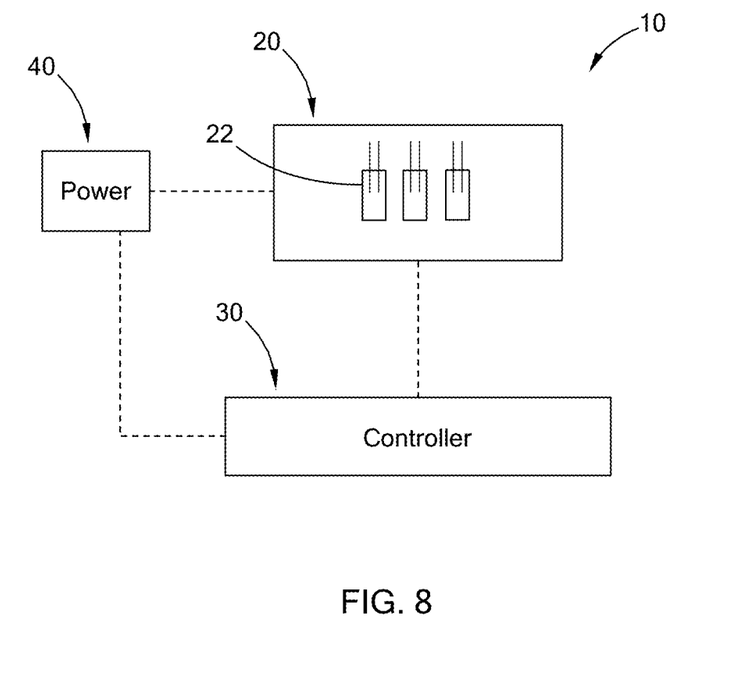
FIG. 8 is a block diagram illustrating a control system constructed according to the teachings of the present disclosure.

Referring to FIG. 8, a control system 10 is shown operable for obtaining data from at least one two-wire resistive heating element of a heater through a controller and adjusting power to the heater. Control system 10 is operable for determining and maintaining a temperature of a resistive heating element 22 of a heating system 20 for heating fluid flow. Resistive heating element 22 is a two-wire resistive heating element. Heating assembly or heater system 20 includes at least one resistive heating element 22 but can include a plurality of resistive heating elements 22 as shown in FIG. 8. Heating system 20, and thus at least one resistive heating element 22, is operatively connected to a controller 30. Controller 30 is adapted to obtain measurements from the at least one two-wire resistive heating element 22 and adjusting power to the heating element when comparing system data provided with the heating element measurements. Controller 30 is thus in communication with a power supply 40. This can be an engine control module (not shown) or a second controller. The power supply 40 is operatively connected to heating system 20 to adjust power and thus heat output of the resistive heating elements 22.

As used herein, the term "model" should be construed to mean an equation or set of equations, a tabulation of values representing the value of a parameter at various operating conditions, an algorithm, a computer program or a set of computer instructions, a signal conditioning device or any other device that modifies the controlled variable (e.g., power to the heater) based on predicted/projected/future conditions, wherein the prediction/projection is based on a combination of a priori and in-situ measurements.

Accordingly, a variety of different forms of heaters, sensors, control systems, and related devices and methods have been disclosed herein for use in fluid flow systems. Many of the different forms can be combined with each other and may also include additional features specific to the data, equations, and configurations as set forth herein. Such variations should be construed as falling within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of predicting temperature of a resistive heating element in a heating system, the method comprising:
    obtaining resistance characteristics of the resistive heating element;
    interpreting and calibrating the resistance characteristics of the resistive heating element based on at least one of a priori measurements and in situ measurements, wherein the a priori measurements include a resistance to temperature relationship that is interpreted and calibrated by using a model-based determination of resistive heating element temperature and resistance measurements, the model-based determination including at least one of a local dR/dT maximum and a local dR/dT minimum of the temperature and resistance measurements; and
    compensating for variations in the resistance characteristics of the resistive heating element over a temperature regime such that the heating system is adjusted near at least one of the local dR/dT maximum and the local dR/dT minimum.

2. The method according to claim 1, wherein the resistive heating element is a nickel chromium alloy.

3. The method according to claim 1, wherein the resistance characteristics of the resistive heating element include at least one of inaccuracies in resistance measurements due to strain-induced resistance variations, variations in resistance due to the rate of cooling, shifts in power output due to exposure to temperature, resistance to temperature relationships, non-monotonic resistance to temperature relationships, system measurement errors, and combinations thereof.

4. The method according to claim 1, wherein:
    the a priori measurements comprise at least one of shift in resistance due to time, shift in resistance due to temperature exposure, resistive heating element temperature, hysteresis in resistance, emissivity, transient rate of heating to applied power, specific transient rate of heating to applied power, specific emissivity, and combinations thereof; and
    the in situ measurements comprise at least one of fluid mass flow, heater inlet temperature, heater outlet temperature, ambient temperature, resistive heating element temperature, temperature of various masses in the proximity of the heater, resistance at local dR/dT maximums, resistance at local dR/dT minimums, room temperature resistance, resistance at service temperatures, leakage current, power applied to the heater, and combinations thereof.

5. The method according to claim 4, wherein resistance changes at local dR/dT maximums and changes in resistance at service temperatures are operable as a multi-point in situ resistance calibration.

6. The method according to claim 1, wherein the resistance to temperature relationship is calibrated and interpreted by obtaining the local dR/dT maximum as a single point in situ calibration, and the method further comprising the step of adjusting the resistance to temperature characteristic.

7. The method according to claim 1, wherein the resistance to temperature relationship is calibrated and interpreted by obtaining the local dR/dT maximum and a plurality of resistance to temperature measurements, wherein the method further comprises the step of determining a multi-point in situ resistance to temperature calibration.

8. The method according to claim 1, wherein the resistance to temperature relationship is calibrated and interpreted by obtaining at least one of the local dR/dT maximums and the local dR/dT minimums as an input for at least one of a steady state modeling of the heating system and a transient modeling of the heating system.

9. The method according to claim 1, wherein the resistance to temperature relationship is calibrated and interpreted by comparing at least one of the local dR/dT maximums and the local dR/dT minimums with a thermal model for a multi-point in situ calibration.

10. The method according to claim 1, wherein the resistance to temperature relationship is calibrated and interpreted by obtaining in situ heating system information to calibrate the resistance to temperature characteristic without at least one of local dR/dT maximum information and local dR/dT minimum information.

11. The method according to claim 1, wherein the resistance to temperature relationship is calibrated and interpreted by obtaining a slope of the resistance to temperature relationship from a power input.

12. The method according to claim 1, wherein the resistance to temperature relationship is calibrated and interpreted by obtaining shifts in an output of the heating system.

13. The method according to claim 1, wherein the resistance to temperature relationship is calibrated and interpreted by obtaining either shift or drift measurements in a material lot characteristic.

14. The method according to claim 1, wherein the resistance to temperature relationship is calibrated and interpreted by obtaining a resistance thermal model to identify changes in a resistance to temperature curve over time.

15. The method according to claim 1, wherein the resistance to temperature relationship is calibrated and interpreted by obtaining a slope of the resistance to temperature relationship and corresponding temperature of the resistive heating element.

16. The method according to claim 1, wherein the resistance to temperature relationship is calibrated and interpreted by obtaining a plurality of voltage and amperage measurements.

17. The method according to claim 1, wherein the resistance to temperature relationship is calibrated and interpreted by obtaining resistive heating element temperature measurements and at least one of a resistive heating element reliability curve and resistive heating element reliability data.

18. The method according to claim 1, wherein the resistance to temperature relationship is compared to a resistance-based temperature measurement providing a diagnostic capability.

19. The method according to claim 1, wherein a model of the heating system is calibrated and interpreted by obtaining at least one of the local dR/dT maximums and the local dR/dt minimums; and
   wherein the model of the heating system comprises transient models of the heating system and in situ models of the heating system.

20. The method according to claim 1, wherein the resistive heating element temperature is adjusted by obtaining a resistive heating element average temperature measurement to reduce a measurement response delay due to a thermal junction impedance between the resistive heating element and a measuring sensor, and adjusting a control response of a thermal control loop.

21. The method according to claim 1, wherein a convective heat transfer coefficient ($h_c$) is determined by parameters determined from characteristics of the heating system.

* * * * *